United States Patent
Thorigne

[19]

[11] Patent Number: 5,838,235
[45] Date of Patent: Nov. 17, 1998

[54] STATION, A PASSIVE PORTABLE OBJECT AND APPARATUS FOR THE REMOTE EXCHANGE OF INFORMATION BETWEEN THE PASSIVE PORTABLE OBJECT AND THE STATION

[75] Inventor: Yves Thorigne, Verson, France

[73] Assignees: France Telecom, Paris; La Poste, Boulogne Billancourt, both of France

[21] Appl. No.: 708,578

[22] Filed: Sep. 5, 1996

[30] Foreign Application Priority Data

Sep. 6, 1995 [FR] France ................................ 9510445

[51] Int. Cl.⁶ .................................................. G08B 13/14
[52] U.S. Cl. .................... 340/572; 340/825.54; 235/449; 235/451; 342/44
[58] Field of Search ...................... 340/568, 572, 340/693, 551, 825.34, 825.54; 235/380, 441, 449, 492, 493, 451, 440; 342/44, 107

[56] References Cited

U.S. PATENT DOCUMENTS

| | | | |
|---|---|---|---|
| 3,689,885 | 9/1972 | Kaplan et al. | 340/825.34 |
| 3,914,762 | 10/1975 | Klensch | 340/825.54 |
| 4,658,263 | 4/1987 | Urbanski | 343/788 |
| 4,818,885 | 4/1989 | Mongeon et al. | 340/825.54 |
| 4,924,171 | 5/1990 | Baba et al. | 323/347 |
| 5,028,918 | 7/1991 | Giles et al. | 340/825.54 |
| 5,491,468 | 2/1996 | Everett et al. | 340/572 |

FOREIGN PATENT DOCUMENTS

| | | |
|---|---|---|
| 0 309 201 | 3/1989 | European Pat. Off. . |
| 2 707 783 | 1/1995 | France . |
| 2 711 440 | 4/1995 | France . |
| WO 92/09175 | 5/1992 | WIPO . |
| WO 92/17866 | 10/1992 | WIPO . |
| WO 94/11842 | 5/1994 | WIPO . |

*Primary Examiner*—Daniel J. Wu
*Attorney, Agent, or Firm*—Pollock, Vande Sande & Priddy

[57] ABSTRACT

Apparatus for the exchange of information by electromagnetic coupling between a passive portable object and a station comprising: first electromagnetic coupling means for the transmission of data between the portable object and the station, and second electromagnetic coupling means independent of the first means for the transfer of energy and a clock signal to the portable object. A filtering circuit is provided on the station side, which behaves as an inductance at the frequency associated with the data transmission and as a high value impedance at the frequency associated with the energy transfer.

17 Claims, 5 Drawing Sheets

STATION, A PASSIVE PORTABLE OBJECT AND APPARATUS FOR THE REMOTE EXCHANGE OF INFORMATION BETWEEN THE PASSIVE PORTABLE OBJECT AND THE STATION

BACKGROUND OF THE INVENTION

1. Field of the Invention

The present invention concerns the remote exchange of information between a passive portable object and a station.

In general the term portable object refers to a contactless memory card or the like, intended for any application suitable for contactless memory cards, or an electronic label intended, for example, for the automated monitoring of objects such as packages. The portable object is said to be "active" when it comprises an internal energy source (cell or battery) which supplies the various elements constituting the portable object. It is said to be "passive" when it contains no internal source of power.

2. Description of the Related Art

French patent application FR-A-2 711 440 filed by the applicant on 18 Oct. 1993 describes an active portable object exchanging information with a distant station via an electromagnetic coupling.

The transmission of information from the portable object to the station is prompted by the switching of an electronic circuit in the portable object which causes the phase to vary between an alternating reference voltage and an alternating voltage at the terminals of the inductive element (or antenna) of the station during the inductive coupling of the station antenna with the inductive element (or antenna) of the portable object.

In the other direction, the transmission of information from the station to the portable object is prompted by the switching of the electronic circuit of the portable object caused when an alternating voltage is induced in the inductive element of the portable object by the application of an alternating signal in the inductive element of the station.

In practice, during the dialogue phase, the distance between the station and the portable object varies from 1 to 10 cm.

The present invention addresses the problem of eliminating the internal power source of the portable object in order to render it autonomous.

An apparatus is already known in which the same alternating signal and the same antenna are used for the exchange of information and the transfer of energy.

However, the implementation of data transmission from the station to the portable object requires the use of complex modulation, phase modulation for example, which requires sophisticated demodulation electronics in the portable object. Similarly, the electronics must permanently provide the function of clock recovery and energy transfer in the portable object and cannot use simple modulation, such as all or nothing modulation. Also, when several stations are close to each other, radio-electric parasitic voltages can disrupt the exchange protocols.

Furthermore, the applicant has found that the antenna emitting the remote supply signal (here the second inductive station element) is liable to interfere with the antenna dedicated to data transmission (here the first inductive station element).

SUMMARY OF THE INVENTION

The present invention presents a solution to these problems.

It concerns an apparatus in which the station comprises
a first generator of a first alternating voltage with a first selected frequency and
a first resistive station element with a first terminal linked to the first generator and a second terminal.

A series arrangement is linked to the second terminal and has at least a first inductive station element, a first capacitive station element and a second resistive station element. The series arrangement is able to generate at its terminals a second alternating voltage.

A station processing means is linked to the first and second terminals of the first resistive station element and is able to process phase variations between the first and second alternating voltages.

The portable object comprises
an electronic circuit comprising a first inductive object element and a first capacitive object element. The circuit is switchable between an inactive state and an active state in which it forms a resonant circuit with the first inductive station element.

Object processing means are provided which are able to switch the electronic circuit as a function of the information to be transmitted to the station. The phase variation between the first and second alternating voltages induced by this switching enables the station processing means to deduce from this the information thus transmitted to the station.

In a general definition of the invention, the station further comprises
a second generator of a third alternating voltage with a selected second frequency different from the first frequencys.

A second inductive station element is linked to the second generator, independent of the first inductive station element and is able to create a predetermined magnetic field.

The portable object also comprises
a second inductive object element independent of the first inductive object element.

A second capacitive object element is linked to the terminals of the second inductive object element. The second inductive object element is being able to form a tined loop with the second inductive station element in order to create at the terminals of the second inductive object element an induced alternating supply voltage in the presence of the magnetic field created by the second inductive station element.

The station further comprises a filter circuit of the dipole type interposed between one of the electrodes of the first capacitive station element and one of the terminals of the first inductive station element. The filter circuit is able to behave as an inductance at the first frequency and a high value impedance at the second frequency.

Thus, the apparatus according to the invention eliminates the internal energy source of the portable object and creates a supply voltage with energy appropriate for supply of the elements constituting the portable object. It thus allows easier implementation of the energy and data transfer functions and better protection from interference between adjacent stations in relation to an apparatus using the same alternating signal and the same antenna for the exchange of information and the transfer of energy. Moreover, the filter circuit of the station allows cancellation of the interference of the remote supply antenna with the antenna dedicated to the transmission of data.

In practice, the filter circuit comprises an inductive element and a capacitive element connected in parallel and arranged between the first capacitive and inductive elements of the station.

According to another characteristic of the invention, the first and second inductive station elements have approximately the same geometric dimensions and are superimposed another.

The advantage of such an arrangement is that it is easy to implement in relation to a particular juxtaposition of one antenna on the other.

Moreover, thanks to such an arrangement of station antennae, it is not necessary to apply the portable object in a particular geometric relation with respect to the station. It is sufficient, according to the invention, simply to use the portable object close to the station antennae.

In another preferred embodiment of the invention, the portable object also comprises clock recovery means linked to the terminals of the second inductive object element and able to recover a clock signal from the induced alternating supply voltage. The clock signal is intended to set the timing of the elements, of logic or memory type, constituting the passive portable object. Advantageously this clock recovery allows elimination of any internal clock device, for example of quartz, in the portable object.

In practice, the portable object also comprises rectifying means linked to the terminals of the second inductive object element and able to rectify the induced alternating supply voltage into a DC supply voltage intended to supply the object processing means.

Preferably the portable object also comprises an energy regulation circuit linked to the outlet of the rectifying means and able to regulate the induced DC supply voltage as a function of the distance between the station and the portable object.

BRIEF DESCRIPTION OF THE DRAWINGS

Other characteristics and advantages of the invention will appear in the light of the detailed description below and the attached drawings in which.

DETAILED DESCRIPTION OF THE PREFERRED EMBODIMENTS

Figure 1:
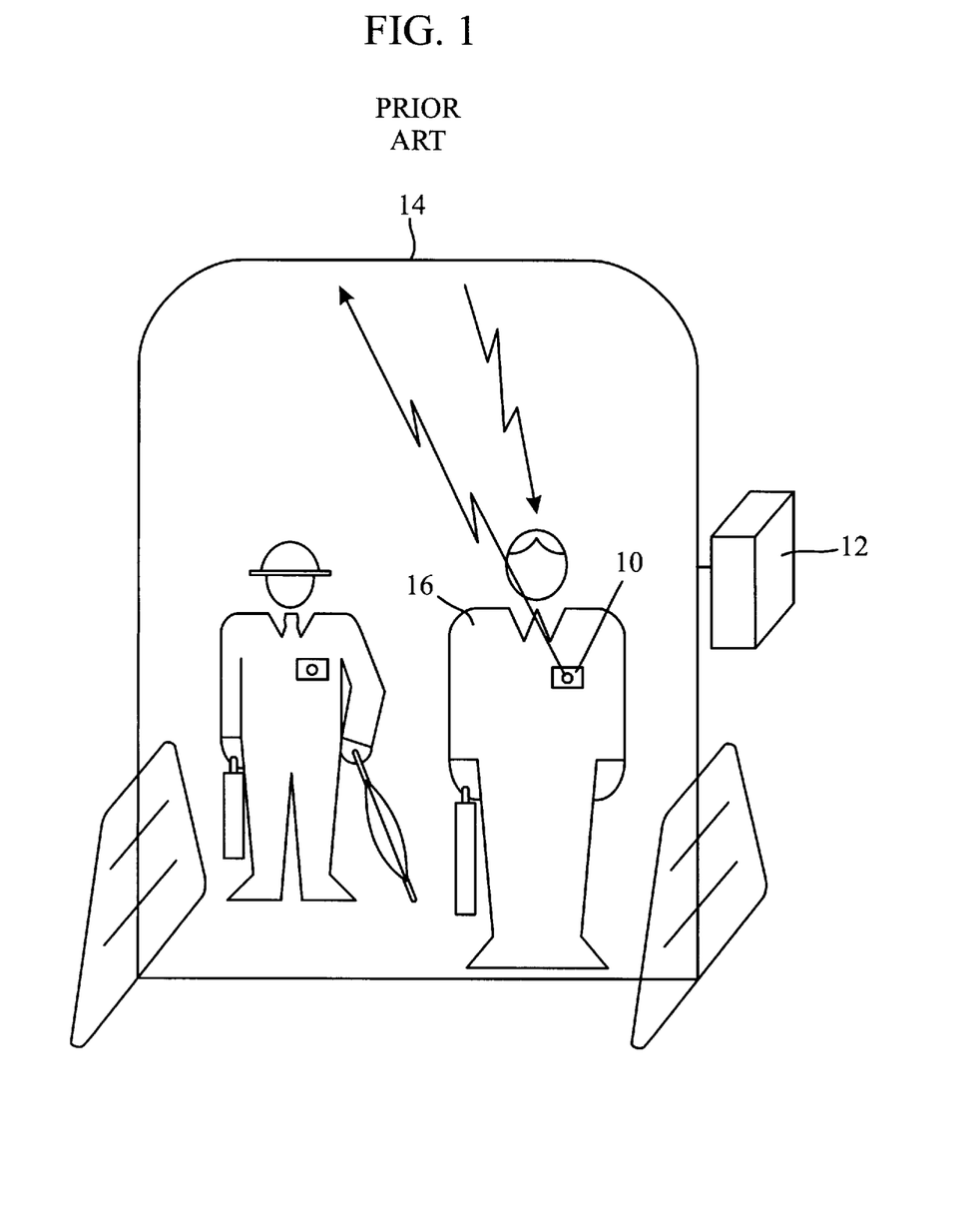
FIG. 1 shows diagrammatically an information exchange apparatus associated with access control according to the prior art.

According to FIG. 1, in a particular embodiment of the invention which is in no way limiting, the portable object 10 is of the memory card type and the station is a terminal 12 equipped with an inductive gate 14 through which a person 16 can pass carrying the memory card 10.

For example, the station may be is an electronic assembly contained in a housing of selected dimensions. For example, the dimensions so which are 40 cm×16 cm with a thickness of 4 cm.

Additionally, the portable object may be, for example, a device with dimensions 8.5 cm×5.4 cm and thickness 0.5 cm. The portable object is intended to be presented in front of the station. This portable object may achieve a speed of 1 m/s. During the dialogue phase, the distance between the station and the portable object may vary from 1 to 10 cm.

The operation performed on each passage allows the station to read a memory region contained in the portable object and then write to the same memory region new information sent by the station.

Figure 2:
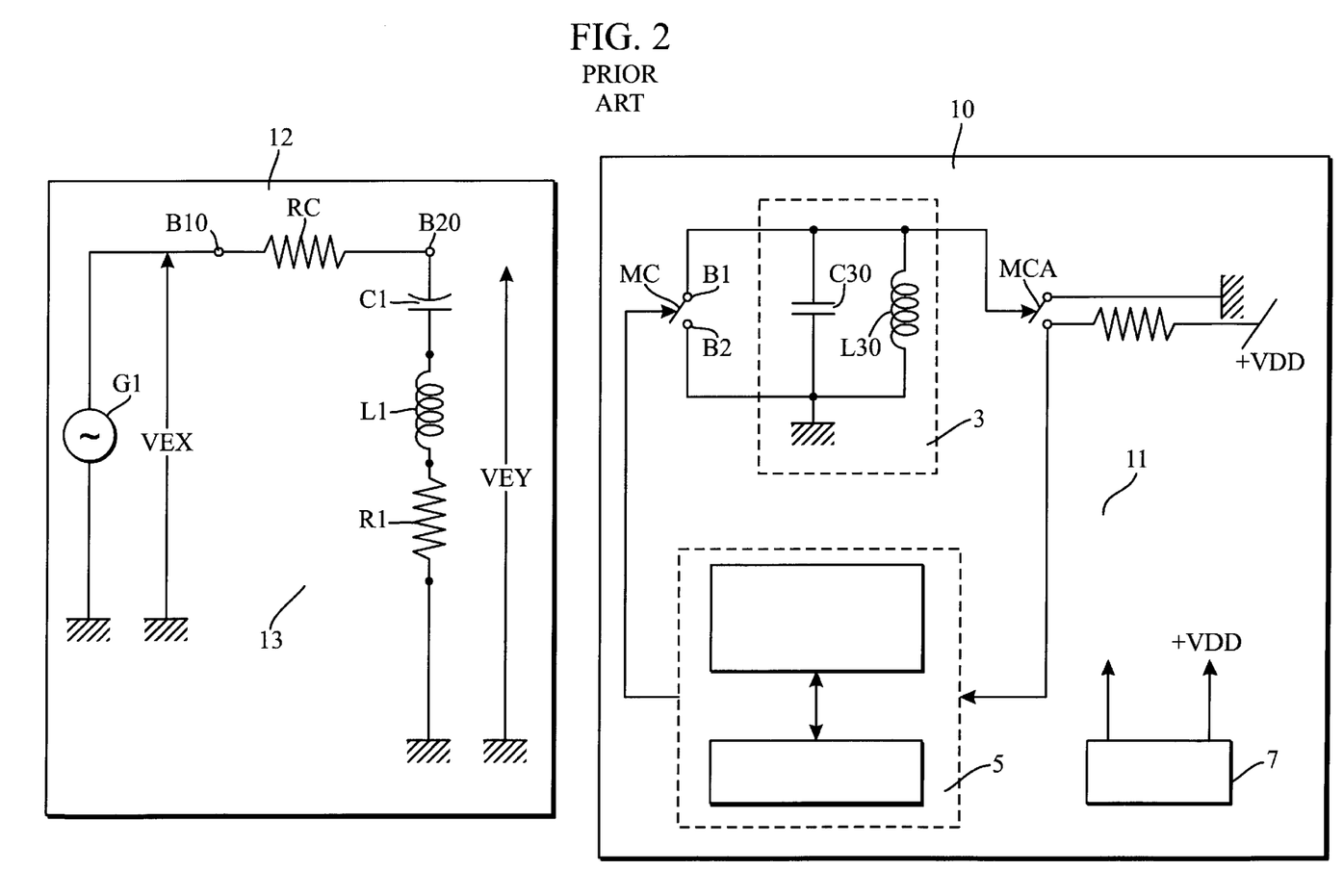
FIG. 2 shows diagrammatically the information exchange apparatus between an active portable object and a station according to the prior art.

FIG. 2 shows at least in part the apparatus for the exchange of information by electromagnetic coupling between a portable object and a station such as that described in patent application FR-A-2 711 440 mentioned above.

In general, station 12 comprises a block 13 dedicated to data transmission.

Such a block is described in detail in the above patent application, the content of which is incorporated herein by reference.

Essentially block 13 comprises:
  a first generator GI of a first alternating voltage VEX with a first selected frequency F1,
  a first resistive station element RC with a first terminal B10 linked to the first generator G1 and a second terminal B20,
  a series arrangement linked to the second terminal B20 and having at least a first inductive station element L1, a first capacitive station element C1 and a second resistive station element R1, said arrangement being able to generate at its terminals a second alternating voltage VEY,
  station processing means (not shown) linked to the first and second terminals of the first station resistive element RC and able to process the phase variations between the first and second alternating voltages VEX, VEY.

For its part, the portable object 10 comprises a block 11 dedicated to data transmission.

This block 11, described in detail in the above patent application, essentially comprises:
  an electronic circuit 3 switchable between an inactive state and an active state in which it forms a resonant circuit with the first inductive station element L1, and
  object processing means 5 able to switch the electronic circuit 3 as a function of the information to be transmitted to the station, the phase variation between the first and second alternating voltages induced by this switching enabling the station processing means to deduce from this said information.

The electronic circuit 3 comprises an inductive element L30 and a capacitive element C30.

In a preferred embodiment, the antenna L30 has a value of 9 $\mu$H divided over 8 windings and the capacitor C30 has a value of 61 pF.

The transmission of information from the portable object 10 to the station 12 is prompted by the switching of the electronic circuit 3 of the portable object (by the action of switching means MC) which causes variation in the phase between the reference alternating voltage VEX and the alternating voltage VEY at the terminals of the series arrangement L1, C1 and R1 of the station, during the inductive coupling of the station antenna L1 with the inductive element (or antenna) L30 of the portable object.

In the other direction, the transmission of information from the station to the portable object is prompted by the switching of the electronic circuit of the portable object (by the action of switching means MCA) caused when an alternating voltage is induced in the inductive element L30 of the portable object by application of an alternating signal in the inductive element L1 of the station.

For example, the generator GI supplies an alternating voltage VEX a peak voltage of 1.5 volts and with a frequency F1 equal to 6.78 MHz.

An internal power source 7 delivers a DC supply voltage +VDD to the constituent elements of block 11.

According to the invention, the internal power source of the portable object which supplies the constituent elements of block 11 is eliminated thanks to the addition of a system of energy transfer by induction with two antennae independent of those dedicated to the transmission of data.

Figure 3:
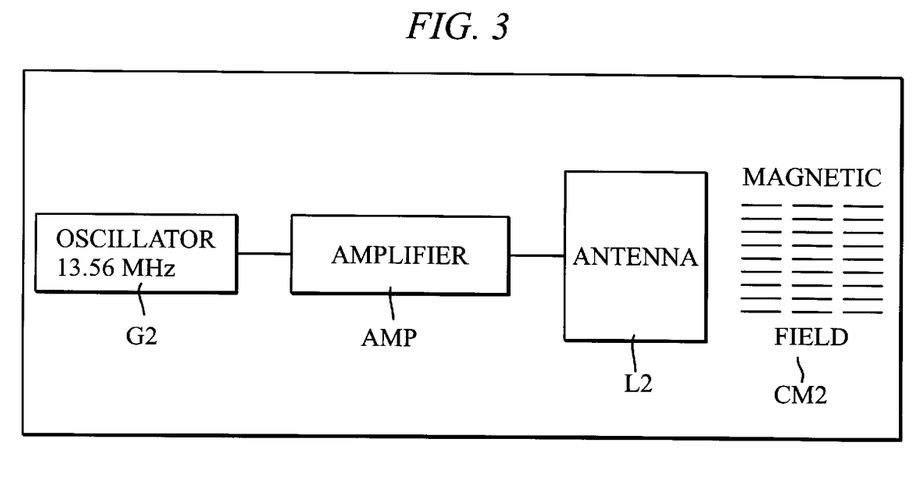
FIG. 3 is a diagrammatic representation of the constituent elements of the system of energy transfer by induction on the station side according to the invention.

According to FIG. 3, the system of energy transfer by induction is based on the generation of an alternating supply signal by a second generator (G2) arranged in the station.

In practice, the second generator G2 is an oscillator able to supply an alternating signal at frequency F2 different from the first frequency F1 dedicated to data transmission, and for example equal to 13.56 MHz.

A second inductive station element (or antenna) L2 is linked to the second generator G2 through amplifying means AMP.

The antenna L2 is independent of antenna L1. It creates a magnetic field CM2 when conducting a signal of frequency F2.

The two frequencies F1 and F2 differ from each other so as to allow cancellation of the radio-electric interference of the system ensuring the transfer of energy in the system and ensuring the exchange of information.

The frequency of the radio-electric signal ensuring the transfer of energy from the station to the portable object is chosen such that it allows the best yield of energy transmission.

The two antennae L1 and L2 of the station are active, i.e. they each emit a magnetic field. The intensity of field CM2 emitted by antenna L2 ensuring the transfer of energy is substantially greater than the intensity of field CM1 emitted by antenna L1 ensuring the exchange of information.

It should be noted that in the case where several stations are close to each other, the interference between stations is reduced in relation to contactless systems with remote supply using a single frequency for the transfer of energy and the exchange of information.

In general, for a given voltage, the remote supply power is maximum for a minimum inductance value on the station side. As the inductance is proportional to the number of windings, this is minimum for an antenna L2 consisting of a minimum number of windings. In practice antenna L2 comprises a single winding.

Figure 4:
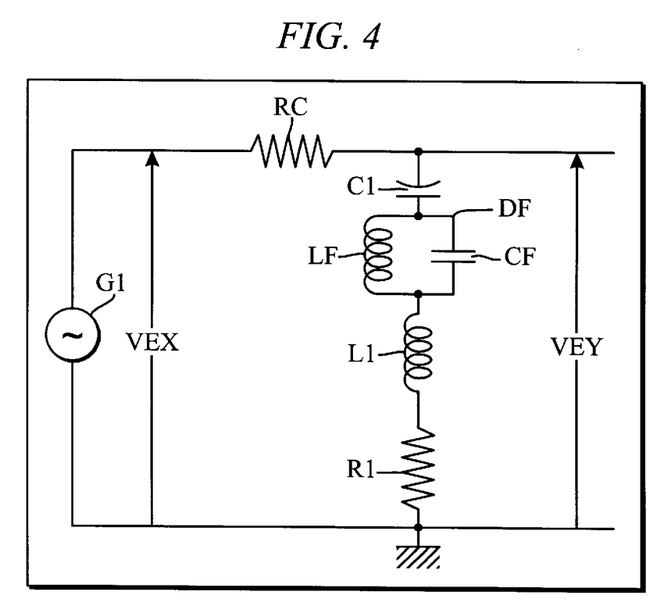
FIG. 4 shows diagrammatically the block dedicated to the transmission of data in the station described with reference to FIG. 2 and modified according to the invention.

On FIG. 4, according to the invention, block 13 described with reference to FIG. 2 is connected to a filtering device DF able to reject a spectrum band centred around the second frequency F2 equal to 13.56 MHz. This filtering device comprises an inductive element LF and a capacitive element CF mounted in parallel between one of the electrodes of capacitor C1 and one of the terminals of the inductive station element L1.

This filtering device DF is a band rejection filter, i.e. a filter which does not transmit frequency F2 and which allows all other frequencies to pass, in particular frequency F1 associated with data transmission. The filtering device DF behaves as an inductance at frequency F1 and as an impedance of very high value (for example of the order of 20 to 30 kOhms) at frequency F2.

This type of filtering is possible because the station comprises a series arrangement of L1–C1.

According to the invention, the antennae L1 and L2 are approximately of the same geometric dimensions. They are superimposed one over the other, which consequently ensures maximum coupling between them.

Under these conditions, the arrangement of antennae L1 and L2 must then only meet the needs of the application, i.e. must allow the function of the system in a defined zone in order to provide the required ergonomics.

It is not necessary to apply the portable object in a particular geometric relation with respect to the station. It is sufficient according to the invention merely to apply the card close to the station antennae.

In practice, the dimensions of antennae L1 and L2 correspond to those of a rectangle of length 17 cm and width 7 cm. The system thus allows a functional zone with an area slightly less than the dimensions of the station antennae.

For example, the remote supply antenna L2 consists of a single winding and antenna L1, dedicated to data transmission consists of approximately three contiguous windings. The number of windings of antenna L1 depends on the peak voltage VEX supplied by the generator G1 and the station-card coupling characteristics. The production technology for antenna L1, in particular the value of the overvoltage coefficient of the electronic circuit 3 of the portable object at frequency F1, must also be taken into account in determining the number of windings.

The applicant has obtained satisfactory results with the following numerical values:

resistive element RC 50 Ohms capacitive element C1 72 pF inductive element L1 3.1 $\mu$H inductive element L2 0.4 $\mu$H capacitive element CF 42.1 pF inductive element LF 3.35 $\mu$H resistive element R1 3 Ohms (part of this resistive element corresponds to the real part of the impedance of antenna L1).

Also, the inductive element LF in parallel with capacitive element CF has an impedance equivalent to an inductance equal to 4.46 $\mu$H at frequency F1.

Figure 5:
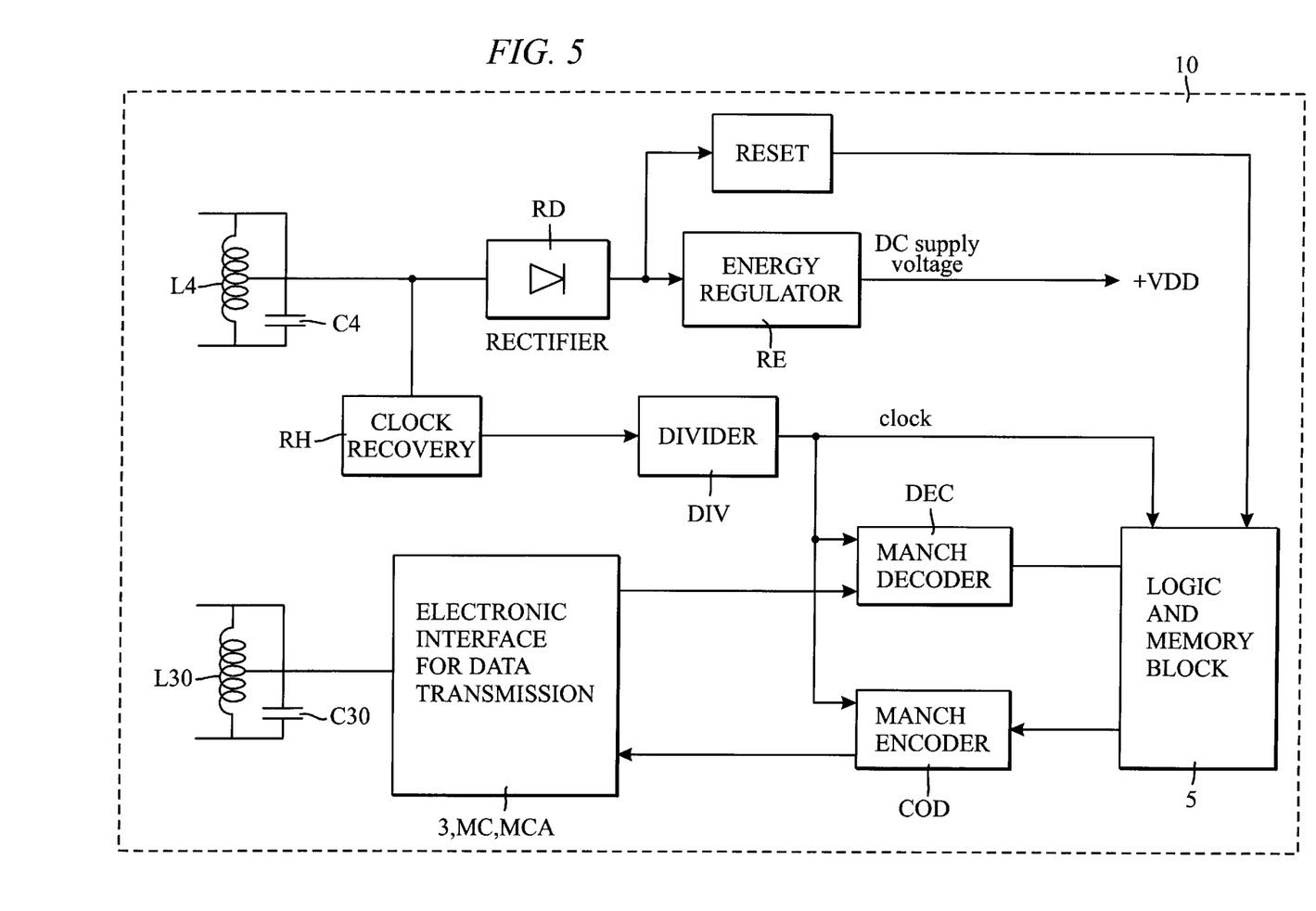
FIG. 5 is a diagrammatic representation of the essential constituent means of the portable object according to the invention.

FIG. 5 shows the constituent means of the portable object. Here we see the system dedicated to data transmission described with reference to FIG. 2. According to the invention, it is supplemented with an antenna L4 intended to be coupled electromagnetically to antenna L2 of the station.

A tuning capacitor C4 at frequency F2 is also provided to form a tuned loop with the inductive station element L2. Such a loop generates at the terminals of antenna L4 an induced alternating supply voltage in the presence of the magnetic field created by the inductive station element L2.

Rectifying means RD, for example of the double alternation type, are linked to the terminals of antenna L4 in order to rectify the induced alternating supply voltage into a DC supply voltage +VDD intended to supply the object processing means.

Advantageously, an energy regulation circuit RE is linked to the output of the rectifying means RD to regulate the induced DC supply voltage as a function of the distance between the station and the portable object.

In practice the energy regulation circuit RE comprises an electronic device of parallel regulation type.

To improve the remote supply yield, it is preferable to have a number of windings n in antenna L4 of the portable object such that the yield of the remote supply system is maximized, and to have a single winding at antenna L2 of the station. It should be noted that the number of windings is limited by the technology of the portable object. In order to reduce the production costs of the portable object, antenna L4 is produced in the form of windings engraved on a substrate (epoxy glass for example). The number of windings n is, for example, four for an area of the portable object of the type described above.

In practice, antenna L4 has a value of 4.1 $\mu$H and capacitor C4 a value of 33.5 pF.

Furthermore, the regulation of the voltage +VDD in the portable object is associated with the regulation of the current passing through antenna L2 of the station. This regulation is adapted such that the voltage present in the terminals of antenna L2 is inversely proportional to the distance between the station and the portable object. The desired aim is to obtain a reduction in the intensity of the magnetic field emitted by antenna L2 when the portable object approaches antenna L2 of the station. The solution is obtained via a source G2 dedicated to the supply which behaves as a current generator.

Clock recovery means RH connected to the terminals of antenna L4 recover a clock signal from the induced alternating supply voltage.

This clock signal is intended to set the timing of the elements 5 of the logic type or memory type constituting the passive portable object.

Advantageously, this clock recovery eliminates any internal clock device, for example of quartz, in the portable object.

It should be noted that the portable object also comprises divider means DIV linked to the output of the recovery means RH and able to. divide the frequency of the clock signal thus recovered into a sub-multiple selected to set the timing of the object processing means 5.

A RESET function is available to correctly initialize the logic elements of the object processing means 5.

Coding means COD and decoding means DEC of the MANCHESTER type are also provided between the object processing means 5 and the electronic data transmission interface described with reference to FIG. 2 and comprising the electronic circuit 3 and the switching means MC and MCA.

The timing of these coding and decoding means is set by the clock signal from the divider means.

Figure 6:
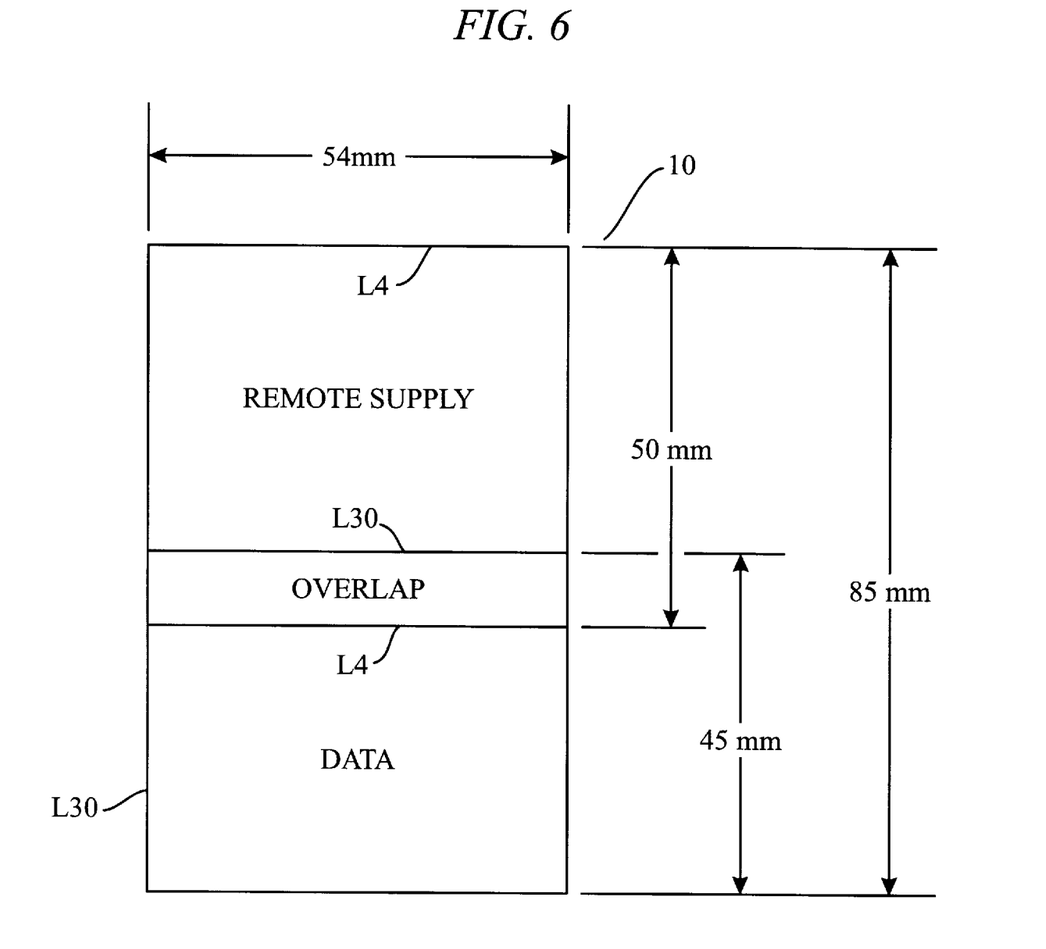
FIG. 6 is a diagrammatic representation of the two antennae of the portable object according to the invention.

The antennae L4 and L30 are arranged on the portable object in a particular geometry.

In the case of a portable object (FIG. 6) of the memory card type of standard dimensions, namely 85 mm×54 mm, the remote supply antenna L4 is, for example, a rectangle 50 mm×54 mm and the data transmission antenna L30 is, for example, a rectangle 45 mm×54 mm. Antenna L4 therefore overlaps antenna L30 by 10 mm.

The applicant has found that the coupling between these two antennae L4 and L30 is disruptive (i.e. generates interference on the data transfer function) when the overlap exceeds 10 mm.

The material production of the portable object according to the invention, by elimination of the cell (or battery) and the quartz resonator, has allowed integration of the electronic assembly into a single silicon chip with the exception of three components which are of the miniature capacitor type for elements C4, C30 and a smoothing capacitor for the supply voltage (not shown).

It should be noted that the fact of providing two independent signals on the portable object has the advantage of separating, for the production of the electronic system on the portable object, the energy transfer and clock functions on one side from the data transfer functions on the other.

While a preferred embodiment of the invention has been described above, since variations in the invention will be apparent to those skilled in the art, the invention should not be construed to the specific embodiment described above.

I claim:

1. An apparatus for the exchange of information by electromagnetic coupling between a portable object and a station, in which said station comprises:

a first generator of a first alternating voltage with a first selected frequency, a first resistive station element with a first terminal linked to the first generator and a second terminal, a series arrangement linked to the second terminal and having at least a first inductive station element, a first capacitive station element and a second resistive station element, said arrangement having a pair of terminals and being able to create a second alternating voltage at said terminals, station processing means connected to the first and second terminals of the first resistive station element and able to process phase variations between the first and second alternating voltages, and in which said portable object comprises:

an electronic circuit comprising a first inductive object element and a first capacitive object element, said circuit being switchable between an inactive state and an active state in which it forms a resonant circuit with the first inductive station element, object processing means able to switch the electronic circuit as a function of information to be transmitted to the station, the phase variation between the first and second alternating voltages induced by this switching enabling the station processing means to deduce therefrom said information, wherein said station further comprises:

a second generator of a third alternating voltage of a second selected frequency different from the first frequency, wherein the portable object also comprises:

a second inductive object element independent of the first inductive object element and having terminals, a second capacitive object element linked to the terminals of the second inductive object element, said second inductive object element being able to form a tuned loop with the second inductive station element in order to generate at the terminals of the second inductive object element an inducted alternating supply voltage in the presence of the magnetic field created by the second inductive station element, and wherein the station also comprises a filtering circuit of dipole type interposed between one of the electrodes of the first capacitive station element and one of the terminals of the first inductive station element, said filtering circuit being able to behave essentially as an inductance at the first frequency and an impedance of high value at the second frequency.

2. Apparatus according to claim 1, wherein the filtering circuit comprises an inductive element and a capacitive element mounted in parallel and arranged between the first capacitive and inductive elements of the station.

3. Apparatus according to claim 1, wherein the first and second inductive station elements have approximately the same geometric dimensions and are superimposed one on the other.

4. Apparatus according to claim 3, wherein the second inductive station element comprises a single winding.

5. Apparatus according to claim 4, wherein the first inductive station element comprises approximately three contiguous windings.

6. Apparatus according to claim 1, wherein the portable object further comprises rectifying means linked to the terminals of the second inductive object element and able to rectify the induced alternating supply voltage into a DC supply voltage intended to supply the object processing means.

7. Apparatus according to claim 6, wherein the portable object further comprises an energy regulation circuit linked to the output of the rectifying means and able to regulate said DC supply voltage as a function of the distance between the station and the portable object.

8. Apparatus according to any of the previous claims, wherein the second generator is a current generator.

9. Apparatus according to claim 7, wherein the portable object further comprises divider means linked to the output of the clock recovery means and able to divide the frequency of the recovered clock signal recovered into a sub-multiple selected to set the timing of the object processing means.

10. Apparatus according to claim 1, wherein the portable object further comprises clock recovery means linked to the terminals of the second inductive object element and able to recover a clock signal from the induced alternating supply voltage.

11. Apparatus according to claim 1, wherein the station further comprises amplifying means able to amplify the third alternating supply voltage from the second generator.

12. Apparatus according to claim 1, wherein second inductive object element comprises n windings, with n an integer approximately equal to four.

13. Apparatus according to claim 1, wherein the first and second inductive object elements are arranged in relation to each other in accordance with a predetermined geometric relationship intended to limit radio-electric interference.

14. Apparatus according to claim 1, wherein the portable object is a passive contactless memory card.

15. Apparatus according to claim 1, wherein the portable object is an electronic label.

16. A station for the exchange of information by electromagnetic coupling between the station and a portable object, said station comprising:

a first generator of a first alternating voltage with a first selected frequency, a first resistive station element with a first terminal linked to the first generator and a second terminal, a series arrangement linked to the second terminal and having at least a first inductive station element, a first capacitive station element and a second resistive station element, said arrangement having a pair of terminals and being able to create a second alternating voltage at said terminals, station processing means connected to the first and second terminals of the first resistive station element and able to process phase variations between the first and second alternating voltages, a second generator of a third alternating voltage of a second selected frequency different from the first frequency, a second inductive station element linked to the second generator, independent of the first inductive station element and able to create a predetermined magnetic field, and a filtering circuit of dipole type interposed between one of the electrodes of the first capacitive station element and one of the terminals of the first inductive station element, said filtering circuit being able to behave essentially as an inductance at the first frequency and an impedance of high value at the second frequency.

17. A portable object for the exchange of information by electromagnetic coupling between the portable object and a station, said portable object comprising:

an electronic circuit comprising a first inductive object element and a first capacitive object element, said circuit being switchable between an inactive state and an active state, in which it forms a resonant circuit with the station;

object processing means able to switch the electronic circuit as a function of information to be transmitted to the station, the phase variation between two alternating voltages at a first selected frequency of the station induced by this switching enabling the station to deduce therefrom said information;

a second inductive object element independent of the first inductive object element and having terminals; and a second capacitive object element linked to the terminals of the second inductive object element, said second inductive object element being able to form a tuned loop with the station in order to generate at the terminals of the second inductive object element an induced alternating supply voltage at a second selected frequency different from the first frequency in the presence of a magnetic field created by the station.

* * * * *